United States Patent
Ould Brahim et al.

(10) Patent No.: US 8,144,715 B2
(45) Date of Patent: Mar. 27, 2012

(54) METHOD AND APPARATUS FOR INTERWORKING VPLS AND ETHERNET NETWORKS

(75) Inventors: Hamid Ould Brahim, Kanata (CA); David Allan, Ottawa (CA); Dinesh Mohan, Kanata (CA)

(73) Assignee: Rockstar Bideo LP, New York, NY (US)

( * ) Notice: Subject to any disclaimer, the term of this patent is extended or adjusted under 35 U.S.C. 154(b) by 322 days.

(21) Appl. No.: 12/104,598

(22) Filed: Apr. 17, 2008

(65) Prior Publication Data

US 2009/0041023 A1    Feb. 12, 2009

Related U.S. Application Data

(60) Provisional application No. 60/964,278, filed on Aug. 10, 2007.

(51) Int. Cl.
*H04L 12/28* (2006.01)
(52) U.S. Cl. .......... 370/401; 379/242; 710/316
(58) Field of Classification Search .......... 370/401, 370/395.53, 248, 289; 709/220
See application file for complete search history.

(56) References Cited

U.S. PATENT DOCUMENTS

| | | | |
|---|---|---|---|
| 2005/0089047 A1* | 4/2005 | Ould-Brahim et al. .. | 370/395.53 |
| 2005/0190757 A1* | 9/2005 | Sajassi ................. | 370/389 |
| 2006/0190570 A1* | 8/2006 | Booth et al. ............ | 709/220 |
| 2007/0280267 A1 | 12/2007 | Ould-Brahim | |
| 2008/0212595 A1* | 9/2008 | Figueira et al. ......... | 370/401 |
| 2008/0298259 A1* | 12/2008 | Susilo .................. | 370/248 |

FOREIGN PATENT DOCUMENTS

| | | |
|---|---|---|
| WO | WO 2007/101140 A2 | 7/2007 |
| WO | WO 2008/089370 A1 | 7/2008 |

OTHER PUBLICATIONS

International Search Report and Written Opinion form UK patent application 0814067.5 , Sep. 25, 2008, 5 pages.
Ali Sajassi, et al., "VPLS Interoperability with Provider Backbone Bridges" draft-ietf-l2vpn-vpls-pbb-interop-00.txt, Internet Draft, L2 Working Group, Oct. 20, 2009.
D. Caviglia, et al., "RSVP-TE Signaling Extension for Management Plane to Control Plane LSP Handover in a GMPLS Enabled Transport Network" draft-ietf-ccamp-pc-spc-rsvpte-ext-04, Internet Draft, CCAMP Working Group, Sep. 22, 2009.

* cited by examiner

*Primary Examiner* — Dang Ton
*Assistant Examiner* — Lionel Preval
(74) *Attorney, Agent, or Firm* — Anderson Gorecki & Manaras LLP

(57) ABSTRACT

To allow seamless interworking between an 802.1ah service instance (ISID) and a VPLS service instance, the AGI value used to signal the setup of the pseudowire portion of the VPLS may carry the ISID value of an associated 802.1ah service instance. This allows the service instance to be identified end-to-end across the Ethernet and VPLS networks using the same value without modifying how the MPLS network operates. The VPLS network will use AGI/AII signaling to set up pseudowires on the MPLS network, but instead of using an AGI value assigned by the MPLS network, the AGI value that is assigned will be taken from the ISID value of the Ethernet frame or from ISIDs registered by the Ethernet network. The AGI message may be given a new type value indicating that the AGI message carries a value that corresponds to the ISID value on an attached Ethernet network. Alternatively, an existing AGI message type may be used to carry the ISID value, and a second type field may be used to indicate that the AGI contains an ISID value.

21 Claims, 3 Drawing Sheets

METHOD AND APPARATUS FOR INTERWORKING VPLS AND ETHERNET NETWORKS

CROSS REFERENCE TO RELATED APPLICATIONS

This application claims priority to U.S. Provisional Patent Application No. 60/964,278, entitled METHOD AND APPARATUS FOR INTERWORKING VPLS AND PBB NETWORKS filed Aug. 10, 2007, the content of which is hereby incorporated herein by reference. This application also claims priority to the U.S. Provisional Patent Application that results from the conversion of U.S. Utility patent application Ser. No. 12/006,245, filed Dec. 31, 2007, which was entitled METHOD AND APPARATUS FOR INTERWORKING VPLS AND ETHERNET NETWORKS, the content of which is hereby incorporated herein by reference. Applicants filed a petition to convert this Utility patent application to a provisional application on Apr. 15, 2008, and are thus claiming priority to the provisional application that results therefrom.

BACKGROUND OF THE INVENTION

1. Field of the Invention

The present invention relates to communication networks and, more particularly, to a method and apparatus for interworking Virtual Private LAN Service (VPLS) and Ethernet networks.

2. Description of the Related Art

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how packets should be handled or routed through the network by the network elements, and how information associated with routing information should be exchanged between the network elements.

Ethernet is a well known networking protocol that has been defined by the Institute of Electrical and Electronics Engineers (IEEE) as standard 802.1. Conventionally, Ethernet has been used to implement networks in enterprises such as businesses and campuses, and other technologies such as Multi-Protocol Label Switching (MPLS) have been used to transport network traffic over longer distances. As the Ethernet standards have evolved over time, Ethernet has become more viable as a long distance transport technology as well. Each evolution to the original 802.1 standard has been implemented as a new standard, and the various standards are continuing to evolve over time.

FIG. 1 shows several fields that have been added to the Ethernet frame format over time. As shown in FIG. 1, the original Ethernet frame format specified by IEEE 802.1 included a source address (C-SA) and a destination address (C-DA). IEEE 802.1Q added a Customer VLAN ID tag (C-Tag) and IEEE 802.1ad added a provider VLAN ID tag (S-Tag). The C-Tag contains a VLAN ID that allows the customer to specify a VLAN, while the S-Tag contains a second VLAN ID that allows the service provider to specify a VLAN on the service provider's network for the frame. When a network is implemented using 802.1ad it may be referred to as Q in Q encapsulation or Provider Bridging (PB). A domain implemented using this Ethernet standard will be referred to as a Provider Bridging (PB) domain.

The Ethernet standard has evolved to also allow for a second encapsulation process to take place as specified in IEEE 802.1ah. Specifically, an ingress network element to a service provider's network may encapsulate the original Ethernet MAC header (C-MAC) with an outer MAC header (B-MAC). The B-MAC header includes a destination address on the service provider's network (B-DA), a source address on the service provider's network (B-SA), a VLAN ID (B-VID) and a service instance tag (I-SID). A domain implemented using MAC-in-MAC encapsulation according to the 802.1ah Ethernet standard will be referred to as a Provider Backbone Bridging (PBB) domain.

There are also two other Ethernet standards that have been developed or which are in the process of being developed that may be used in one or more of the domains. Specifically, IEEE 802.1Qay specifies a way for the network elements to switch traffic based on the B-DA and B-VID rather than just forwarding the traffic according to the B-DA and B-SA. The header of the frames forwarded on an Ethernet network established using this technology is not changed, but the manner in which the information is used is changed to allow forwarding to take place in a different manner. A network domain that forward traffic using this forwarding paradigm will be referred to as Provider Backbone Trunking (PBT).

PBB, PB, and the original Ethernet standard all use a spanning tree protocol to determine which links should be used to broadcast traffic on the Ethernet network and which links should be used to forward unicast traffic on the network. To overcome some of the shortcomings of using spanning trees, another Ethernet standard is in the process of being developed as IEEE 802.1aq, in which a shortest path routing protocol such as Intermediate System to Intermediate System (IS-IS) or Open Shortest Path First (OSPF) is used on the control plane to establish forwarding paths through the network. Traffic on the domain may then be forwarded based on the B-DA and B-VID in a manner similar to PBT, but will follow shortest path trees rather than spanning trees in the domain. A domain implemented in this manner will be referred to herein as a Provider Link State Bridging (PLSB) domain. PLSB is described in greater detail in U.S. patent Ser. No. 11/537,775, filed Oct. 2, 2006, entitled "Provider Link State Bridging," the content of which is hereby incorporated herein by reference.

When a customer frame is received at an ingress node on a PBB network, it will be encapsulated such that a provider MAC header will be added to the original MAC header. The outer MAC header that is applied by the ingress node to the provider network includes a MAC address of the destination network element (B-DA) on the provider network. Encapsulating customer frames to include a MAC header specific to the provider network allows the network elements on the provider network to forward frames using the provider addressing space rather than relying on the customer addressing space. Since presumably there will be fewer provider nodes than there are customer addresses, this allows the forwarding tables of the provider network elements to be smaller than if the customer address space were used.

Since more than one customer may be transmitting frames from an ingress node to an egress node, the destination MAC address (B-DA) does not allow the egress node to differentiate which traffic belongs to which customer. To enable the egress node to avoid having to look at the inner MAC header, the ingress node assigns a service ID (I-SID) to the frames entering the network. The I-SID is included in the B-MAC header and can be used by the egress node to identify the customer or VLAN associated with the frame and, hence, to which customer it should forward the frame. FIG. 9 graphically illustrates a tunnel on an Ethernet network carrying traffic for multiple customers/VLANs that is able to be differentiated according to the ISID.

As mentioned above, MPLS is another commonly used networking protocol. MPLS specifies a way in which a label switched path may be established through a network. When a packet is received at an MPLS Label Edge Router (LER) the LER will determine the destination LER for the packet, attach a label to the packet, and forward the packet to a first Label Switch Router (LSR) on the path to the destination LER. The LSR will strip the label from the packet, look up the label to determine the next label to be applied to the packet and the next hop for the path, and forward the packet onward to the next hop. This proceeds hop by hop across the network to cause the packet to be forwarded across the Label Switched Path (LSP) through the MPLS network.

The LSP connects a pair of nodes on the MPLS Network. Since more than one customer may need to transmit traffic between the pair of endpoints, it is desirable to allow multiple customers to share one LSP rather than creating a new LSP for each customer. In MPLS, this is accomplished through the use of Pseudowires. Pseudowires allow traffic for different VLANs to be tagged with a service label, so that traffic from multiple customers, VPNs, etc., can use a common LSP and be differentiated by the egress LER. A service that utilizes a pseudowire will be referred to as a Virtual Private Wire Service (VPWS).

In addition to pseudowires, a branching mechanism was developed for MPLS that will allow a given packet that is received at a label switch router (LSR) to be duplicated and passed out of more than one forwarder. A service that utilizes this feature of an MPLS network will be referred to as a Virtual Private LAN Service (VPLS). VPLS uses pseudowires to set up the paths through the network but allows the paths defined by the pseudowires to branch to emulate a Local Area Network (LAN). FIG. 10 graphically illustrates an MPLS LSP carrying MPLS traffic for multiple customers/VLANs that is included in multiple pseudowires.

VPLS uses the signaling protocol described in draft-ietf-12vpn-signaling-08.txt and IETF RFC 4447 to set up pseudowires. The content of each of these protocols is hereby incorporated herein by reference. RFC 4447 introduces the concept of an Attachment Group Identifier (AGI) that may be conceptualized as a VPN identifier or VLAN identifier. The AGI specifies a logical group of forwarders at the egress node, rather than a particular individual forwarder. When implemented in this manner, an attachment circuit associated with a particular VPLS or pseudowire is constructed to include the Attachment Group Identifier (AGI) that identifies the group of forwarders, and an Attachment Individual Identifier (AII) that identifies a particular forwarder within the group.

In operation, the MPLS network will establish label switched paths through the network using a Label Distribution Protocol (LDP). As part of this process, the LDP will allow the Label Edge Routers (LERs) to exchange AGI/AII pairs that will allow the network to setup the dataplane for the pseudowires. This will set up the forwarders at the nodes to cause the packets to be forward in a specified manner. When a frame arrives at the ingress LER, the ingress LER will check the signaled value of AGI/AII pairs with local information and apply a service label as well as a tunnel label. The tunnel label will be used to forward the frame along the LSP through the MPLS network, while the service label will be used by the egress node to obtain the context of the pseudowire at the egress so that the frame may be sent to the correct set of forwarders. The forwarders will then be used to forward the traffic to the correct customer/VPN as the traffic exits the MPLS network. The AGI/AII pairs are thus used in the signaling phase of establishing the VPLS service by the ingress/egress LERs to coordinate how frames should be handled at the egress to cause the frames to be forwarded to the correct customers.

Where a PBB network and VPLS network are interconnected, a particular service instance will be identified using an ISID on the PBB network and will be transmitted over a particular PW on the MPLS network and be output from a particular forwarder or set of forwarders associated with an AGI/AII on the VPLS network. The packet may then be sent to another network such as another Ethernet network or MPLS network. For example, FIGS. 2A-2D show several ways in which Ethernet and MPLS networks may be interconnected. Unfortunately the ISID values and AGI/AII values used to distinguish traffic carried on particular paths through the network are not related, which makes it more difficult to coordinate how these types of networks work together. Where multiple networks are interconnected, the coordination of which ISID and AGI/AII are associated with which VLAN may thus provide a logistical difficulty.

SUMMARY OF THE INVENTION

To allow seamless interworking between an 802.1ah service instance (ISID) and a VPLS service instance, the AGI value used to signal the setup of the pseudowire portion of the VPLS may carry the ISID value of an associated 802.1ah service instance. This allows the service instance to be identified end-to-end across the Ethernet and VPLS networks using the same value without modifying how the MPLS network operates. The VPLS network will use AGI/AII signaling to set up pseudowires on the MPLS network, but instead of using an AGI value assigned by the MPLS network, the AGI value that is assigned will be taken from the ISID value of the Ethernet frame. The ISID values may be learned by the ingress nodes from frames received from the Ethernet network. Alternatively, the ISIDs may be registered on the edge nodes to the VPLS networks and used periodically to signal the establishment of pseudowires on the MPLS network. The AGI message may be given a new type value indicating that the AGI message carries a value that corresponds to the ISID value on an attached Ethernet network. Alternatively, an existing AGI message type may be used to carry the ISID value, and a second type field may be used to indicate that the AGI contains an ISID value.

In another embodiment, the B-Tag or B-VID (B-Tag/B-VID) value used to implement VLAN service on the Ethernet network is used as the AGI value in the MPLS network. This allows network interworking to occur without requiring the networks to be interworked at the service level. The B-Tag/B-VID values may be learned or registered at the edge of the VPLS network. A new AGI message type may be defined to carry the B-Tag/B-VID on the VPLS network so that a common VLAN ID may be used across both the Ethernet and MPLS networks.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Interworking between an Ethernet network and an MPLS network may occur at the network level, in which VLAN segments are mapped to each other, or may occur at the service level in which service instances are mapped to each other. When the networks are interworked at the network level, the VLAN segment from the Ethernet network, identified by the B-Tag or B-VID will be mapped to a Label Switched Path (LSP) in the MPLS network. When the networks are interworked at the service level, an I-SID on the Ethernet network will be mapped to a set of corresponding Pseudowires forming the VPLS portion of the overall service instance in the MPLS network. Embodiments of the invention may be used to implement either type of interworking. Specifically, where the two network domains are to be interworked at the network level, the AGI value in the MPLS network may be configured to carry the value of the B-Tag or B-VID that was used to identify the VLAN on the Ethernet network. Where the two network domains are to be interworked at the service level, the AGI value in the MPLS network may be configured to carry the value of the I-SID that was used to identify the service instance on the Ethernet network.

Figure 3:
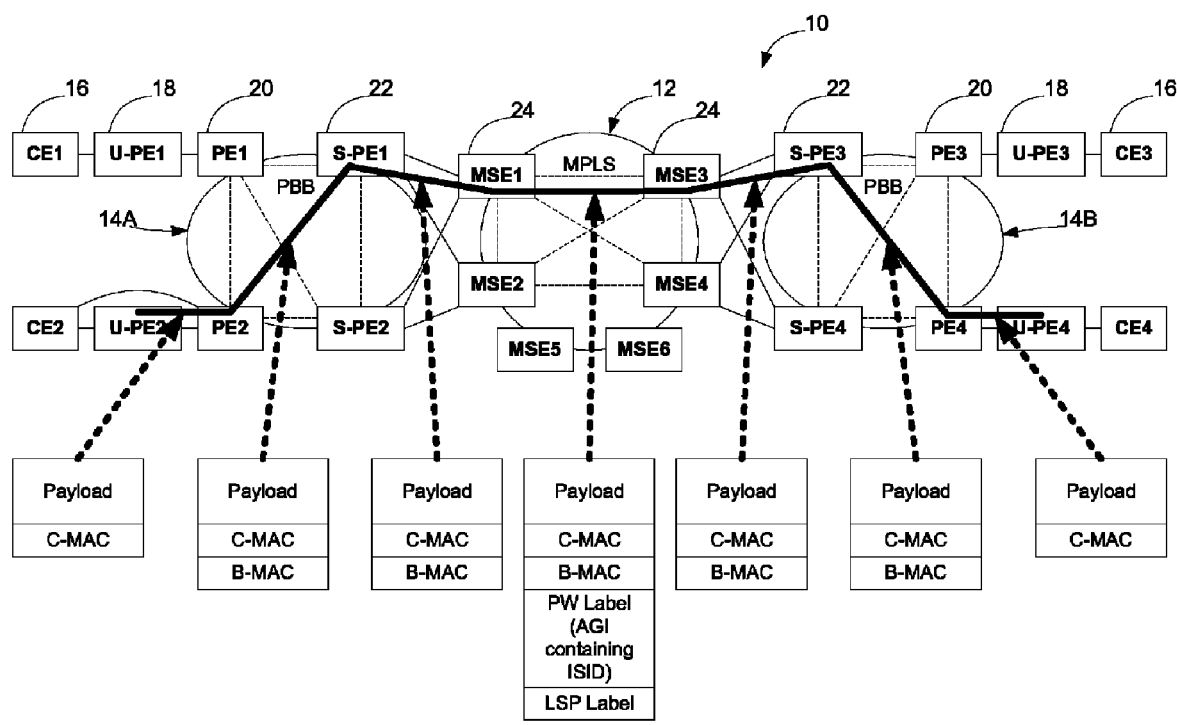
FIG. 3 is a functional block diagram of a reference view of a network including Ethernet access networks and an MPLS core network and illustrates the header format a frame of data as it traverses the network according to an embodiment of the invention.

FIG. 3 illustrates an example network 10 in which a MPLS domain 12 is used to interconnect multiple Ethernet domains 14A and 14B. The Ethernet domains 14A, 14B may be implemented using any one of the Ethernet technologies described. For example, the Ethernet domains may be established using Provider Bridging (PB), Provider Backbone Bridging (PBB), or Provider Backbone Transport (PBT). From a control plane perspective, the Ethernet network may implement a spanning tree (PB, PBB), be manually configured by an OSS (PBT), or a link state routing protocol may be implemented as described above in connection with description of Provider Link State Bridging (PLSB) networks. Thus, although a description of the invention will be provided in connection with an implementation that is implementing 802.1ah (Mac-in-Mac or Provider Backbone Bridging), the invention may also be utilized with other standards that similarly use the I-SID to identify a service instance on the Ethernet network. Examples of several Ethernet standards that also use the I-SID include 802.1Qay which is commonly referred to as Provider Backbone Trunking (PBT) and 802.1aq which is a developing standard and is commonly referred to as Provider Link State Bridging (PLSB). Thus, the invention is not limited to an implementation that utilizes PBB alone, as it may equally apply to other Ethernet protocols that also use an I-SID to carry VLAN information with certain caveats (specifically that in the PLSB case (*,G) registration of I-SIDs in the VPLS space may in certain circumstances produce additional multicast replication and discard of PLSB (S,G) per I-SID multicast trees).

Figure 1:
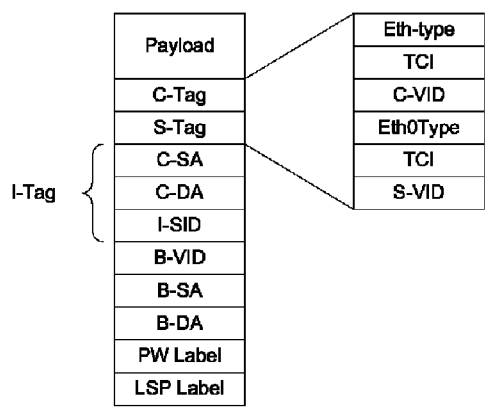
FIG. 1 is a functional block diagram of an Ethernet frame format.
Figure 2A:
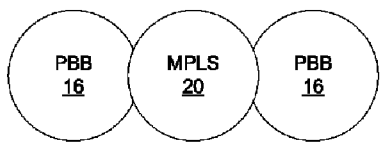
FIGS. 2A-2D are functional block diagrams of communication networks showing four example ways in which Ethernet and MPLS network domains may be connected.
Figure 2B:
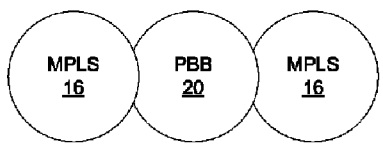
Figure 2C:
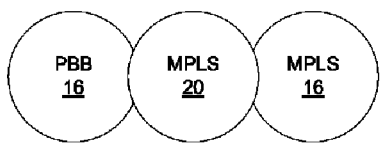
Figure 2D:
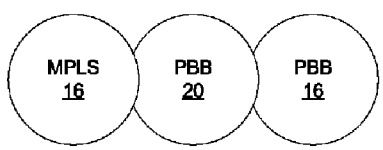

The example reference network shown in FIG. 3 is configured similar to the network configuration of FIG. 2A, in which a MPLS core network is used to interconnect between two Ethernet access networks. The invention is not limited in this manner, however, as MPLS and Ethernet networks may be connected in other configurations, for example as shown in FIGS. 2B-2D. Thus, the example shown in FIG. 3 is intended to be a representative example and is not intended to limit the scope of application of the invention. Accordingly, embodiments of the invention may be implemented wherever one or more MPLS and Ethernet networks are interconnected.

In the example network shown in FIG. 3, customer edge devices 16 connect to user provider edge network devices 18 where the customer traffic is formatted according to one of the Ethernet standards. The Ethernet frames including a payload and Customer MAC header (C-MAC) will be forwarded to a Provider Edge (PE) node 20 to be forwarded on the provider Ethernet network 14A. The Provider Edge (PE) network elements 20 are configured to implement User to Network Interface (UNI) interfaces to enable customers to connect to the network. The provider edge 20 will encapsulate the frame with a provider MAC header (B-MAC) and forward the frame over the Ethernet network 14 to its destination on the Ethernet network.

The access network also has a plurality of Switching Provider Edge (S-PE) network elements 22 configured to implement Network to Network Interface (NNI) interfaces to enable the S-PE network elements to connect to other network elements on the networks. Where the customer traffic is to be forwarded from the Ethernet network 14A to another network such as the MPLS network 12, the customer traffic will be forwarded through the Ethernet network to the S-PE network element 22. The Switching Provider Edge (S-PE) network elements 22 are provided to perform inter-domain transmission of packets for network 14 so that the customer traffic may be transferred from the Ethernet network 14 to the MPLS network 12.

The network elements on the edge of the VPLS service on the MPLS network may learn the B-Tag/B-VID or I-SID values from packets as they arrive at the network. These values may then be used to signal the establishment of pseudowires on the MPLS network as described in greater detail below to implement the VPLS services on the MPLS network. Alternatively, the B-TAG/B-VID or ISID values may be registered at the edge of the VPLS network by any of a number of possible protocol transactions, and used periodically to signal the establishment of VPLS service instances in the MPLS network. Enabling registration to be used to cause signaling of pseudowires within the VPLS network allows resilient access of the Ethernet network to VPLS, since the Ethernet network is thus able to control the establishment of pseudowires across the MPLS network. Where the networks are interworked at the service level, an individual VPLS service instance may thus be created for each I-SID, whereas if the networks are to be interworked at the network level, the VPLS service instance will be created for the B-VLAN.

FIG. 3 illustrates an example path through the network and shows several of the headers that may be applied to the frame as it passes through the network. As shown in FIG. 3, a CE network element will transmit data to a U-PE network element which will encapsulate the data into Ethernet frames to be transported over the Ethernet access network. The U-PE may encapsulate many different native services from the CE, such as TDM over Ethernet, and the invention is not limited by the particular type of native service encapsulated for transport by the U-PE.

The U-PE will forward the Ethernet frames to an ingress PE on the access network 14. The native services will not be visible to the ingress PE on aggregation network, as the UNI at the PE will only see Ethernet frames arriving. The Ethernet frames, when they arrive, will include an Ethernet header including a customer destination MAC address (C-DA), a customer source MAC Address (C-SA), and a payload. The frame may also include an S-Tag and Ether-Type specified by 802.1ad, and a C-Tag and Ethertype specified by 802.1Q. The 802.1Q tag (C-tag) enables a VLAN ID to be added to the Ethernet frame. The particular format of the frame will depend on the version of Ethernet being used by the U-PE.

When the Frame is received by the PE network element 16, it is encapsulated by the PE network element using MAC-in-MAC encapsulation using the process specified in IEEE 802.1ah (Mac-in-Mac). Specifically, the PE network element will map the customer destination MAC address C-DA to a provider destination MAC address (B-DA). The outer MAC header applied by the PE network element will thus include the provider destination MAC Address (B-DA) and the source MAC address (B-SA) which is usually set to the MAC address of the ingress PE. The PE network element determines the I-SID based on the S-tag, determines the B-DA based on the ISID and C-DA, and determines the B-Tag based on the I-SID. The ISID is generally used by the edge nodes to differentiate service instances so that multiple service instances may be carried across the provider network and differentiated without requiring the egress PE to look at the inner MAC header. This is conceptually shown in FIG. 9. As shown in this figure, a given PBB tunnel may carry multiple services, each of which is identified by a particular ISID. The PBB defines the path through the network, while the ISID allows the services carried on the tunnel to be extracted at the egress. Where the Ethernet network is implemented as a PBT domain, the network elements on the Ethernet network will use the B-DA and the B-tag (which includes the B-VID) to forward the frame across the aggregation network rather than just looking at the B-DA when forwarding the frame.

Depending on how the access network is implemented, the ingress PE may offer port-based E-line service or tagged E-line services. The PE uses port or VLAN to identify the service instance. The PE encapsulates the frame in a PBB and/or PBT trunk and forwards the frame across the access network. The ISID, in this instance, is end-to-end unique so that the ISID may be used to identify traffic associated with the E-line service. Although not shown in FIG. 3, PE pairs on opposite ends of the network will maintain primary and secondary PBT trunks through the Ethernet network 14 to provide resiliency to the connection.

When data is transmitted from the Ethernet network to the MPLS network it will be received by a Multi-Service Edge (MSE) network element 24 on the MPLS network. Within the MPLS domain, multiple label switched paths (shown as dashed lines within MPLS domain 12) may be established to enable packets to be transported across the MPLS domain 12 in the usual manner. Different ways of implementing the MPLS domain exist and the invention is not limited to the particular way in which the MPLS domain is set up.

The MSEs on the MPLS network are configured to receive traffic and put the traffic onto Label Switch Paths (LSP) through the network. The MSE network elements thus act as Label Edge Routers (LERs) to assign labels to packets according to the path the packet is to take through the MPLS network. In operation, a MSE will receive a frame from the S-PE and assign a tunnel label which allows the frame to be put on the correct LSP through the MPLS network.

Where the MSE receives a packet with a new B-Tag/B-VID or ISID, the MSE may establish a new pseudowire for the packet to allow the packet to be transmitted across a VPLS instance in the MPLS network. Alternatively, rather than have the MSE establish pseudowires as new VLAN/service instances are learned, the S-PE may register the B-Tag/B-VID or ISID at the edge of the VPLS network. Registration of the ISID by the Ethernet network allows the Ethernet network to indirectly control establishment of pseudowires through the MPLS network and hence to control establishment of VPLS instances for the VLANs and services that are carried in the Ethernet network.

The MSE also adds one or more service labels (pseudowire label) to enable traffic from multiple customers to be multiplexed across a given LSP through the network and allows the frame to be distinguished from other data that is also being carried on the same LSP. This is conceptually shown in FIG. 10, in which the LSP is the tunnel through the network and the service label identifies a service instance on the tunnel. The tunnel label will be used to forward the frame along the LSP across the MPLS network, and the service label will be used to de-multiplex the frame to identify the customer flow at the egress so that the frame may be sent to the correct group of forwarders and, hence, to the correct egress port for the customer.

When a frame is received by an egress MSE, it will be sent to one or more forwarders within the MSE to be transmitted. The forwarders are thus logical entities that specify how a particular class of packets should be forwarded on the network. The service tag (pseudowire tag) allows the egress MSE to identify a group of forwarders (AGI) and optionally an individual forwarder (AII) within the group of forwarders that should be used to handle a particular packet. The packet will then be sent to that forwarder to be transmitted from the MSE.

As described above, pseudowires are signaled using the Attachment Group Identifier, which identifies a logical set of forwarders that are associated with a particular VLAN, and also includes an identification of a particular individual forwarder that is to handle the traffic (AII). Thus, the pseudowires may be established and associated with an AGI/AII pair as described in greater detail in IETF RFC 4447. The AGI/AII is associated with a service instance on the MPLS network. Data traffic on the MPLS network will carry a service label which acts as a pseudowire identifier. The pseudowire identifier will then be used by the egress MSE to determine which group of forwarders should be used to handle the traffic. The set of egress nodes (addresses) in the MPLS network associated with a given AGI is obtained through the use of existing defined mechanisms such as an auto-discovery function, or using a signaling-based MPLS discovery function, or through provisioning.

According to an embodiment of the invention, the B-Tag/B-VID or ISID value used in the Ethernet network to identify the VLAN or service instance may be used during the AGI signaling so that the same value may be used to identify the VPLS service instance within the MPLS network as well as within the Ethernet network. For example, according to an embodiment of the invention, the B-Tag/B-VID or ISID may be transmitted as part of the AGI/AII signaling when the pseudowires are set up, so that the these values may be used within the MPLS network as well as the PBB/PBT network to identify the VLAN or service instance. This may also allow, for example, the egress MSE to identify the group of forwarders that are to handle the traffic based on the B-Tag/B-VID or ISID rather than an arbitrarily assigned AGI number.

FIGS. 4-8 illustrate several examples of how the AGI message may be formatted to carry the B-Tag/B-VID or ISID according to several embodiments of the invention. The invention is not limited to these several examples, but rather extends to other embodiments (other AGI types) in which a 24 bit field of the AGI is dedicated to carrying the B-Tag/B-VID or ISID. Similarly, although the ISID is currently defined as including 24 bits, should the 802.1ah standard be modified or a new standard promulgated that changes the length of the ISID the AGI may be modified to include the alternate length ISID. Likewise, the B-Tag is currently defined to include 16 bits, and includes a 12 bit VLAN ID (B-VID). If this standard is changed, the AGI described herein may be modified as well to accommodate the new length of the B-Tag/B-VID.

IETF RFC 4446 provides that the AGI should have a type value that is 8 bits long. This enables the AGI to have 256 different type values, many of which have not been defined. For example, type value 1 is defined by RFC 4446 as the route distinguisher. Type values 2 through 64 are to be assigned by the IANA using the Expert Review policy defined in IETF RFC 2434. AGI type values 65 through 127 and 255 are to be allocated using the IETF consensus policy defined in RFC 2434. Type values 128-254 are reserved for vendor-proprietary extension and are to be assigned by IANA using the first come first served policy defined in RFC 2434.

Figure 4:
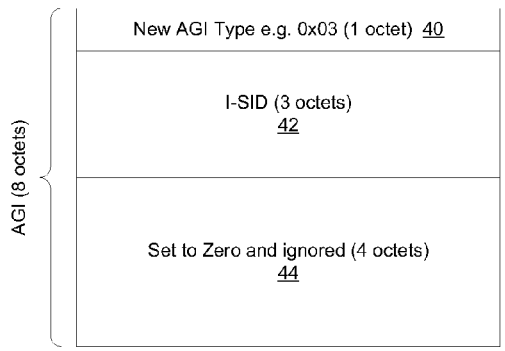
FIGS. 4-8 are diagrams illustrating examples of how an Attachment Group Identifier message may be formatted to carry the ISID and/or B-Tag/B-VID value according to several embodiments of the invention.

FIG. 4 illustrates one possible format of an AGI where a new AGI type 40 is used to carry the ISID, according to an embodiment of the invention. In the example shown in FIG. 4 a new AGI type 40 is defined, and is referred to as 0x03. The 0x03 example type value is merely an example type value and any of the values specified by IETF RFC 4446 may be used if assigned using the appropriate process specified by the policy for that particular value.

If a new AGI type is assigned, as shown in FIG. 4, the AGI message may be formatted to include the AGI type value (1 octet) 40 and the ISID value (3 octets) 42. Additionally, the AGI may include blank space 44 or other information to enable the AGI to have a desired length. In the illustrated example it has been assumed that the length of the AGI message will be 8 octets, and hence the remaining portion of the AGI (4 octets) has been set to 0 and unused. Optionally a length field may be included after the AGI type field 40 to enable the length of the AGI to be specified. Still alternatively the AGI type field may specify the length of the AGI. Other fields may be included as well, such as a field configured to carry the Autonomous System Number (ASN) to identify the autonomous system associated with the AGI. Thus, other fields may be implemented as well.

Figure 5:
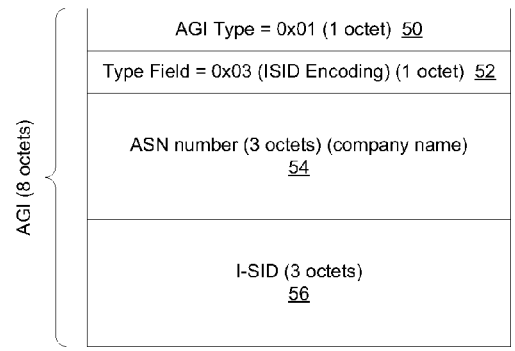

FIG. 5 shows an embodiment of the invention in which an otherwise defined AGI type 0x01 50 is used to carry the ISID. As shown in FIG. 5, the defined AGI Type 0x01 includes a second type field 52 which allows the AGI to be formatted differently to carry different types of information. In the illustrated embodiment, this field 52 may be set to 0x03 to allow the AGI message to specify that the AGI value corresponds with an ISID on an attached Ethernet network. In the illustrated embodiment the AGI includes an ASN (Autonomous System Number) (3 octets) 54 as well as the three octet ISID value 56.

Figure 6:
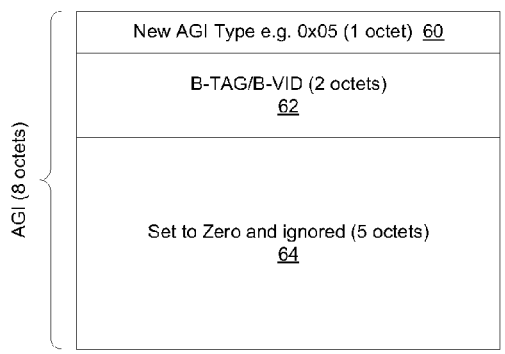

FIG. 6 shows an embodiment of the invention in which a new AGI type 60, such as 0x05 is used to carry the B-Tag or B-VID. In the example shown in FIG. 4 a new AGI type 60 is defined, and is referred to as 0x05. The 0x05 example type value is merely an example type value and any of the values specified by IETF RFC 4446 may be used if assigned using the appropriate process specified by the policy for that particular value.

If a new AGI type is assigned, as shown in FIG. 6, the AGI message may be formatted to include the AGI type value (1 octet) 60 and the B-Tag/B-VID value (2 octets) 42. As mentioned above, the B-Tag is a two octet value, 12 bits of which are used on the Ethernet network as the B-VLAN-ID (B-VID). Where the new AGI type is used to carry the entire B-TAG, the field 62 will be two octets in length. Where the field 62 is only used to carry the B-VID, the additional four bits of the field 62 may be set to zero or used for other purposes.

Similar to FIG. 4, the AGI message shown in FIG. 6 may include blank space 64 or other information to enable the AGI to have a standard length. In the illustrated example it has been assumed that the length of the AGI message will be 8 octets to comply with the current standard, and hence the remaining portion of the AGI (5 octets) has been set to 0 and unused. Optionally a length field may be included after the AGI type field 60 or elsewhere in the AGI message to enable the length of the AGI to be specified. Still alternatively the AGI type field may specify the length of the AGI. Other fields may be included as well, such as a field configured to carry the Autonomous System Number (ASN) to identify the autonomous system associated with the AGI. Thus, other fields may be implemented as well.

Figure 7:
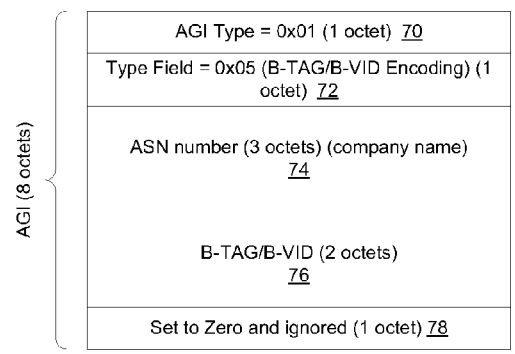

FIG. 7 shows another embodiment in which an otherwise defined AGI type 0x01 70 is used to carry the B-Tag or B-VID. As shown in FIG. 7, the defined AGI Type 0x01 includes a second type field 72 which allows the AGI to be formatted differently to carry different types of information. In the illustrated embodiment, this field 72 may be set to 0x05 to allow the AGI message to specify that the AGI value corresponds with an B-Tag or B-VID on an attached Ethernet network. In the illustrated embodiment the AGI includes an ASN (Autonomous System Number) (3 octets) 74 as well as the two octet B-Tag or 12 bit B-VID value 76. The remaining portion of the AGI message may be set to zero and ignored 78, or reserved for future use.

Figure 8:
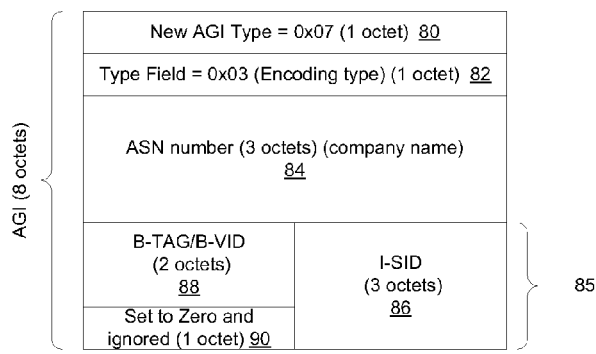

FIG. 8 shows another embodiment in which a new AGI type 0x07 80 is used to carry either the ISID or B-Tag/B-VID. As shown in FIG. 8, the new AGI type 80 has a one-octet sub-type field 82 which is used to define the encoding type. This field may be used to specify whether the Ethernet network and MPLS network are interworked at the service level and, hence, that the AGI carries ISID information from the Ethernet network, or that the Ethernet and MPLS networks are interworked at the network level and, hence, that the AGI carries the B-Tag/B-VID information.

The AGI value may include the ASN number 84. The AGI value also includes an identifier field 85 which either carries the ISID or the B-Tag/B-VID. When the sub-type field is set to a first value, to indicate that the AGI carries the B-Tag/B-VID, the identifier field 85 may include a two octet field carrying the B-Tag/B-VID and the remaining space may be set to zero and reserved for future use/ignored. Where the sub-type field is set to a second value, the identifier field 85 may carry the three octet ISID 90.

In either embodiment, the AGI may carry the ISID so that the ISID may be used to identify the group of forwarders associated with the VLAN on the MPLS network. Accordingly, the ISID may be used within the MPLS network to identify a group of forwarders such that the ISID may be used in both the Ethernet and MPLS networks to identify the VLAN. By carrying the ISID in the AGI while signaling the establishment of the pseudowire on the MPLS network, the ISID may be used end-to-end to identify the service instance in both the PBB network and in the MPLS network.

Figure 9:
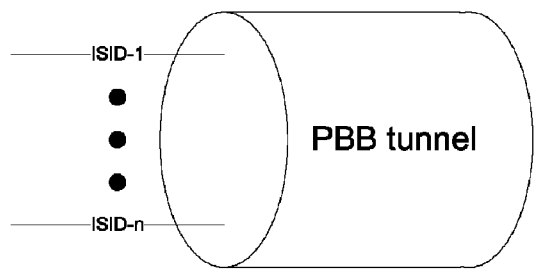
FIGS. 9 and 10 illustrate conceptually how ISID values and pseudowire service labels are used to identify traffic carried on a PBB tunnel or Label Switched Path (LSP)
Figure 10:
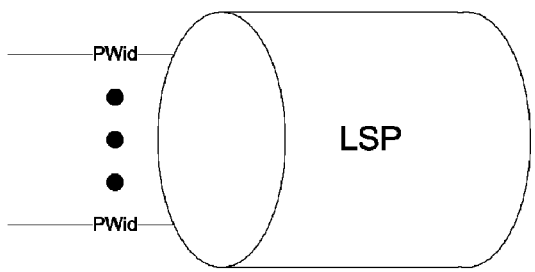

FIGS. 6 and 7 show conceptually how ISIDs relate to PBB tunnels on an Ethernet network and how PWs relate to LSPs on an MPLS network. Specifically, as shown in FIG. 9, a given PBB tunnel may carry traffic from multiple customers or which otherwise should be distinguishable. To do this, an ISID value is associated with each flow of data to allow traffic that is being carried on the tunnel to be demultiplexed at the end of the tunnel according to the ISID value. Similarly, as shown in FIG. 10, on an MPLS network, a LSP through the network may carry traffic for multiple customers. A service label associated with a pseudowire is attached to the traffic as it enters the MPLS network and before the traffic is placed on the LSP through the network. This allows the egress node to determine how the traffic should be handled at the egress from the LSP.

Figure 11:
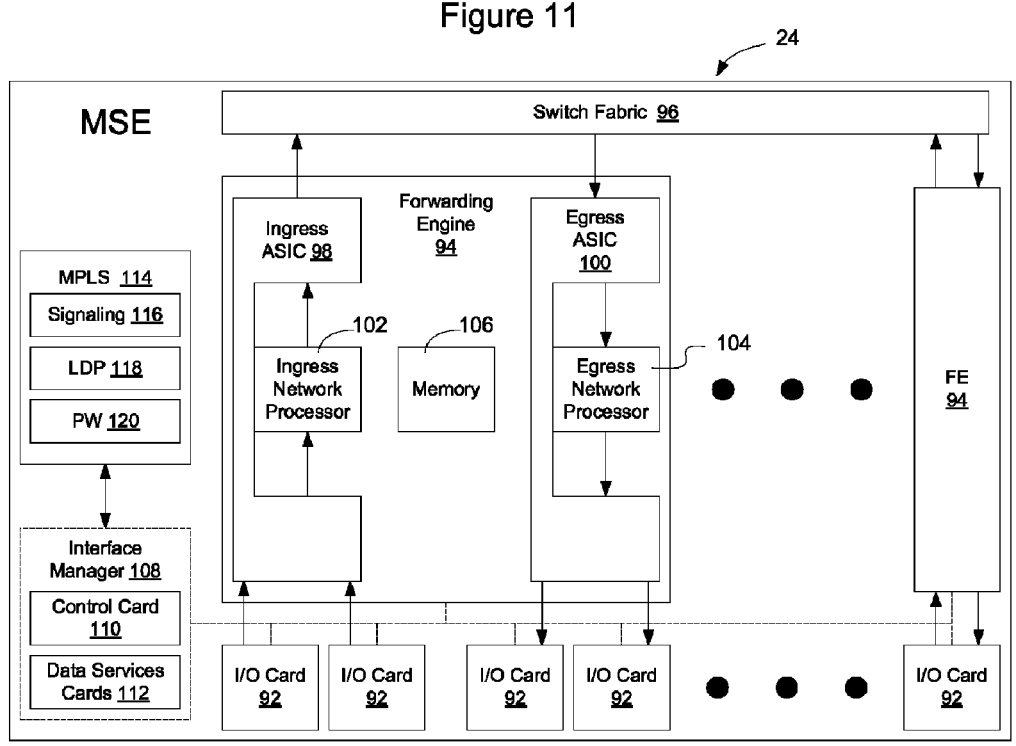
FIG. 11 is a functional block diagram of a network element according to an embodiment of the invention.

FIG. 11 shows an example network element that may be used to implement a MSE 24 according to an embodiment of the invention. The invention is not limited to this embodiment as other network device architectures may be implemented as well. The MSE includes one or more Input/Output (I/O) cards 92 configured to connect to links in the communications network. The I/O cards 92 may include physical interfaces, such as optical ports, electrical ports, wireless ports, infrared ports, or ports configured to communicate with other conventional physical media, as well as configurable logical elements capable of operating as MAC (layer 2) ports under the direction of an interface manager, described in greater detail below.

One or more forwarding engines 94 are provided in the network element to process frames received over the I/O cards 94. The forwarding engines 94 forward frames to a switch fabric 96. The switch fabric 96 enables a frame entering on a port on one or more I/O cards 92 to be output at one or more different ports in a conventional manner. A frame returning from the switch fabric 96 is received by one of the forwarding engines 94 and passed to one or more I/O cards 92. The frame may be handled by the same forwarding engine 84 on both the ingress and egress paths. Optionally, where more than one forwarding engine 84 is included in the network element, a given frame may be handled by different forwarding engines on the ingress and egress paths. The invention is not limited to any particular forwarding engine 94, or switch fabric 96, but rather may be implemented in any suitable network element configured to handle MPLS traffic on a network. One or more Application Specific Integrated Circuits (ASICs) 98, 100 and processors 102, 104 may be provided to implement instructions and processes on the forwarding engines 94. Optionally, a memory 106 may be included to store data and instructions for use by the forwarding engines.

In operation, when a packet is received, one or more of the ASICs 98, 100 and/or one or more of the network processors 102, 104, may read the service label to determine a group of forwarders to be used to forward the packet. This information may then be used to configure the switch fabric to cause the packet to be passed to the correct set of forwarding engines 94 upon leaving the switch fabric and to program the egress ASICs 100 and egress network processors 104 to cause the packet to be sent to the correct I/O card 92 for transmission from the MSE 24.

An interface management system 108, optionally containing one or more control cards 110 and one or more data service cards 112, may be provided to create and manage interfaces on the network element. The interface management system may interact with an MPLS module 114 to enable it to participate in establishing LSPs on the network and to allow the MSE to establish AGI/AII groups of forwarders corresponding to Pseudowires so that the MSE 24 can coordinate how traffic associated with particular service labels or B-Tag/B-VID should be handled by the data plane of the MSE. The interface management system may learn B-Tag/B-VID or ISIDs from traffic as it is received, or these values may be registered as described above. The learned/registered values may then be used to signal the establishment of pseudowires through the MPLS network.

In the embodiment shown in FIG. 11, the MPLS module includes code to enable the MSE to engage in MPLS signaling such as the AGI signaling described herein 116, label distribution 118, and the establishment of pseudowires 120. As discussed above, in operation the label distribution module will be involved with the establishment of label switched paths through the network. AGI signaling will then be used to allow AGI/AII groups of forwarders to be associated with pseudowires that are established through the network. The interface manager takes the information obtained by these modules and uses the information to configure the I/O cards 92 and/or forwarding engines 94 of the data plane so that the MSE may be configured to handle data traffic on the MPLS network.

When the functions described herein are implemented in software, the software may be implemented as a set of program instructions embodied in a tangible computer readable medium and configured to cause control logic in one or more processors to perform the methods described herein. The functions described herein may also be implemented in hardware, or in a combination of hardware and software. It will thus be apparent to a skilled artisan that all or some of the logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, software embodied on a tangible computer readable medium and used to program a microprocessor, or any other device including any combination thereof.

Programmable logic can be fixed temporarily or permanently in a tangible medium such as a read-only memory chip, a computer memory, a computer disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of interworking a MultiProtocol Label Switched (MPLS) network and an Ethernet network, the method comprising the steps of:
   associating a Backbone Service Instance Identifier (I-SID) value in the Ethernet network with a service instance in the Ethernet network that is to span between the Ethernet network and the MPLS network;
   communicating the I-SID value to an ingress node on the MPLS network;
   deriving a MPLS service identifier for the service instance in the MPLS network from the I-SID value that was associated with the service instance in the Ethernet network;
   determining a set of egress nodes on the MPLS network from the MPLS service identifier;
   signaling, by the ingress node on the MPLS network, a setup of at least one pseudowire for the service instance in the MPLS network;
   wherein a value of the MPLS service identifier for the service instance in the MPLS network is the same as the I-SID~value that was associated with the service instance in the Ethernet network.

2. The method of claim 1, wherein the service identifier is an Attachment Group Identifier (AGI).

3. The method of claim 1, wherein the I-SID value in the Ethernet network is registered by the Ethernet network at a point of attachment to the MPLS network to allow the Ethernet network to control establishment of the pseudowires in the MPLS network.

4. The method of claim 1, wherein the pseudowire is associated with a Virtual Private LAN Service (VPLS) in the MPLS network.

5. The method of claim 1, wherein the step of signaling the setup of the at least one pseudowire includes transmitting an AGI message having an AGI type value specifying that the AGI value carried in the AGI message is derived from or the same as the I-SID value.

6. The method of claim 1, wherein the step of signaling the setup of the at least one pseudowire includes transmitting an AGI message having a standard AGI message type, but which contains a type field indicating that the AGI message is an I-SID encoding AGI message.

7. The method of claim 2, wherein the AGI value is the same as the I-SID value.

8. The method of claim 2, wherein the AGI value identifies a logical group of forwarders at an egress node on the MPLS network.

9. The method of claim 8, wherein the step of signaling further identifies an Attachment Individual Identifier (AII) that is to be used to forward packets received over the pseudowire.

10. A method of signaling establishment of a pseudowire in a MultiProtocol Label Switching (MPLS) network, the method comprising the steps of:
    obtaining identifying information associated with a Flow in an Ethernet network;
    deriving an Attachment Group Identifier (AGI) value from the identifying information; and
    using the derived AGI value to signal the establishment of a pseudowire in the MPLS network for a service instance in the Ethernet network that is to span between the Ethernet network and the MPLS network;
    wherein the AGI value of the pseudowire in the MPLS network has an identifying value within the MPLS network that is the same as the identifying information associated with the Flow in the Ethernet network.

11. The method of claim 10, wherein the identifying information is a Backbone VLAN tag (B-Tag) or Backbone VLAN ID (B-VID) from the flow in the Ethernet Network, and wherein the AGI value is derived from the B-Tag or B-VID.

12. The method of claim 10, wherein the identifying information is a Backbone Service Instance Identifier (I-SID) value associated with a service instance in the Ethernet network, and wherein the AGI value is derived from the I-SID value.

13. The method of claim 12, wherein the I-SID value is registered by the Ethernet network at a point of attachment to the MPLS network.

14. The method of claim 12, wherein the I-SID value is learned from a packet received from the Ethernet network.

15. The method of claim 12, wherein the Ethernet network is implemented to use a link state protocol as a control plane.

16. The method of claim 12, wherein the pseudowire is established on a Label Switched Path through the MPLS network.

17. A network, comprising:
    an Ethernet domain implemented to enable service instances identified by Backbone Service Instance Identifier (I-SID) values to be carried on paths through the Ethernet network; and
    a MultiProtocol Label Switch (MPLS) domain connected to the Ethernet domain at a point of attachment between the MPLS domain and the Ethernet domain, the MPLS domain being implemented to enable Virtual Private LAN Service (VPLS) pseudowires to be established on Label Switched Paths (LSPs) through the MPLS domain, the pseudowires being established by Attachment Group Identifier (AGI) signaling in the MPLS domain;
    wherein I-SID values from the Ethernet domain are used during the AGI signaling in the MPLS domain to allow the I-SID values to be used end-to-end across the network to identify a service instance on both the Ethernet domain and the MPLS domain.

18. The network of claim 17, wherein the I-SID values are registered at the point of attachment between the MPLS domain and the Ethernet domain.

19. The network of claim 17, wherein the I-SID values are learned at the point of attachment between the MPLS domain and the Ethernet domain.

20. The network of claim 17, wherein an AGI message type value used during AGI signaling has a message type indicating that the AGI message carries an I-SID value from the Ethernet domain.

21. The network of claim 17, wherein an AGI message type value used during AGI signaling has a message type value that is a normal AGI message type value, and wherein the AGI message contains a sub-type value indicating that the AGI message carries an I-SID value from the Ethernet domain.

* * * * *